May 7, 1957  J. MORITZ  2,791,493
MANUFACTURE OF SULPHURIC ACID
Filed June 7, 1952  4 Sheets-Sheet 1
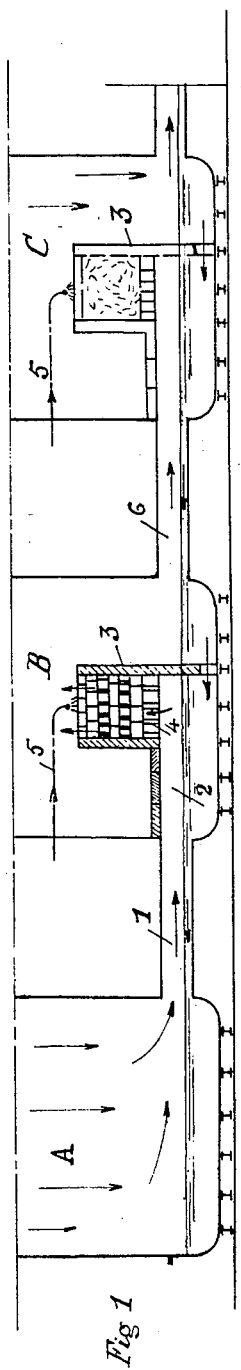
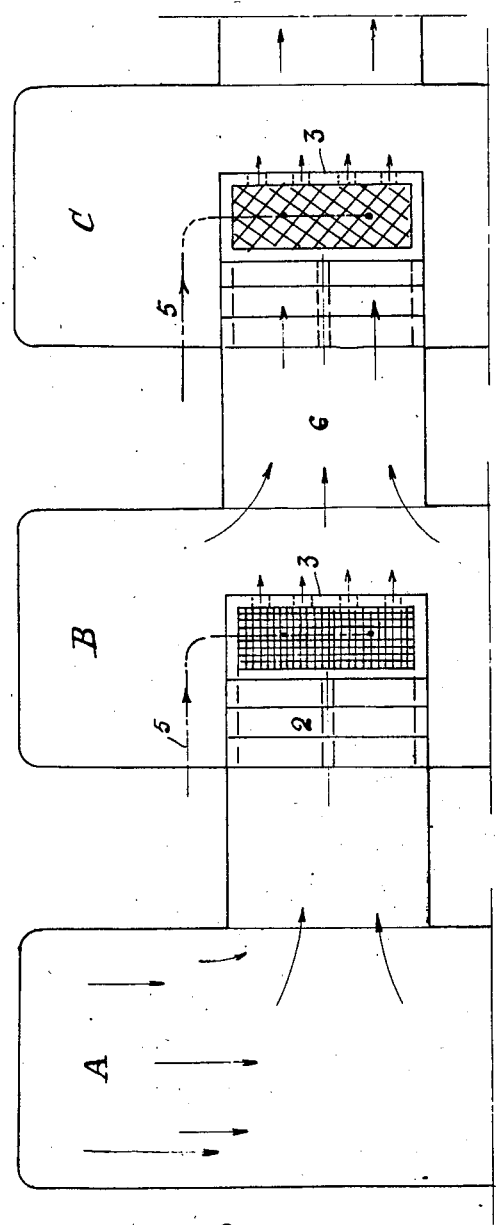
Fig 1
Fig 2
Inventor
J. Moritz May 7, 1957  J. MORITZ  2,791,493
MANUFACTURE OF SULPHURIC ACID
Filed June 7, 1952 4 Sheets-Sheet 2

Inventor
J. Moritz

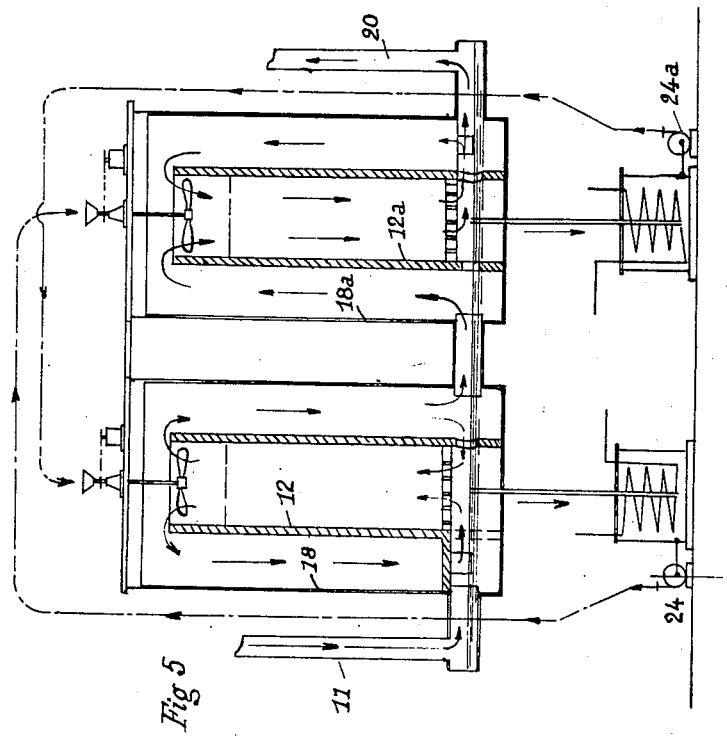

United States Patent Office 2,791,493
Patented May 7, 1957

2,791,493

MANUFACTURE OF SULPHURIC ACID

Jean Moritz, Chatou, France

Application June 7, 1952, Serial No. 292,225

Claims priority, application France June 7, 1951

2 Claims. (Cl. 23—261)

Reaction towers have been used for many years for causing reaction between gases and liquids, between liquids or between gases, and such reaction towers, when they are well sprayed permit the attainment of high production rates per cubic metre of space occupied, when used in the manufacture of sulphuric acid.

However, all the existing systems at present use only reactions in liquid phase between the products introduced into the apparatus, and the present invention provides a succession of utilisations of phases of reaction in liquid medium, followed immediately afterwards by phases of reaction in gaseous medium, owing to the combination of lead chambers, and more particularly chambers with low communicating passages, with internal reaction towers.

These possibilities of alternating the passage from the liquid medium to the gaseous medium and vice versa as many times as desired allow the reaction to be carried out in the direction most favourable for the intensive and economic production of sulphuric acid.

The accompanying drawing shows diagrammatically by way of example various embodiments of the invention.

Figure 4:
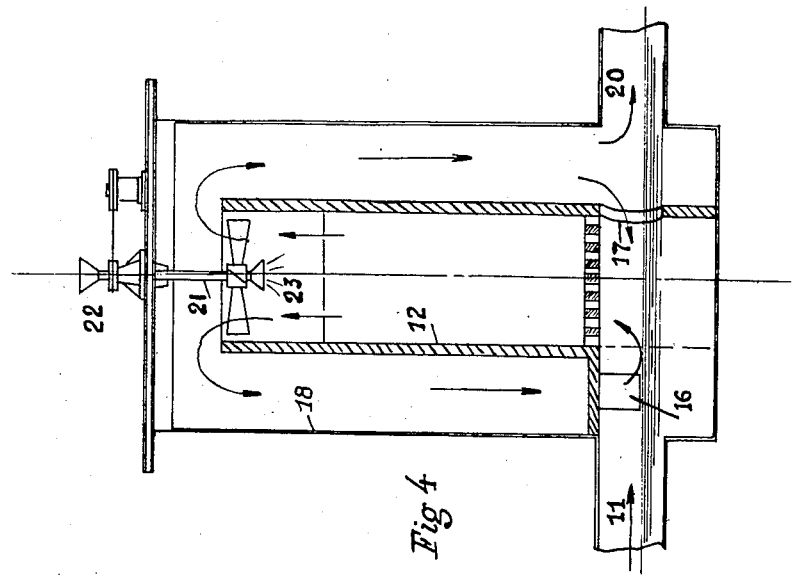
Figure 3:
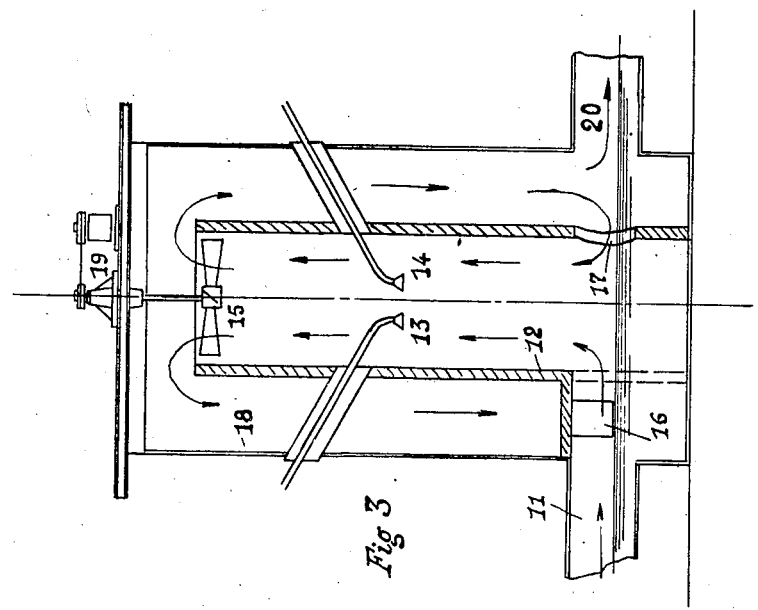
Figure 6:
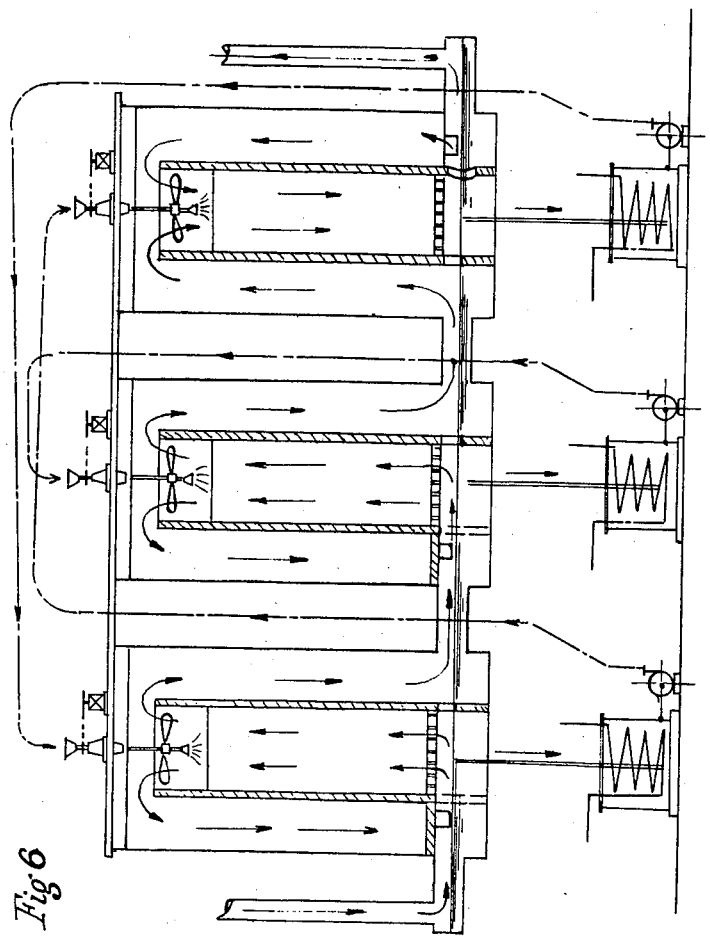

Figure 1 is a view in vertical section of a group of chambers of a system of high chambers having low communicating passages and provided with reaction towers of low height, Figure 2 is a plan view, Figure 3 is a view in vertical section of a chamber with high internal tower, Figure 4 is a modification, Figure 5 shows a system of two chambers with internal tower of the type of Figure 4, and Figure 6 is a system of three chambers with internal towers.

In the chambers with low communicating passages the flow of gases at the bottom of the chambers and above the level of the acid makes it possible to take advantage of this supply of gas at the bottom of the chamber in order to create in the acid systems with low communicating passages a novel possibility which consists in again increasing the concentration of nitrous products in the reacting gases in proportion as this is required by their impoverishment. For this purpose there is added to the conduit forming a low communication between the chambers, an extension placed in the chamber in the path of the gases coming from one chamber and passing to the next chamber, which conduit opens at the top and carries the gas towards the centre of the chamber into a device provided with baffles or checkerwork which can be sprayed with nitrous sulphuric acid and which allows the gases to be again enriched with nitrogen oxide and with moisture if necessary. These devices are placed at points considered favourable in the chamber system, thus permitting the addition at these points of more or less rich nitrous acid coming from a Gay-Lussac tower, or from a gas drying conduit, or from recycled acid from the vessel, whereby, by increasing the content of nitrous products in the gases, a more intense action can thus be created in the various chambers where this is necessary, and the formation of sulphuric acid can be increased or accelerated. For example, in a lead chamber system with seven chambers, such devices could be placed in the second chamber for the gases coming from the first chamber, in the fourth chamber for the gases coming from the third chamber, and in the sixth chamber for the gases coming from the fifth chamber. The acid circulating in the vessels always passes from one chamber to another at the bottom of the conduits which form the low communicating passages and the gas contacts the acid in passing above in countercurrent.

The central part of these chambers with internal towers is used to the best advantage, while in the conventional constructions the central part of the chambers constitutes a dead or only slightly active zone.

In Figure 1 gases from the first chamber A pass through the low communication 1 and the conduit 2 which consists of an extension of the low communication, preferably of horizontal rectangular section, ending in a kind of tower 3 which is open at the top and situated in the chamber B, for example at the centre. This tower of acid-resistant material and of large cross-section, as shown in plan in Figure 2, is provided with checkerwork or baffles and at its lower part may or may not be provided with a grid 4 at the level of the top of the communicating passage 1, and the top of this grid receives the suitably supported checkerwork consisting of hollow bodies, bricks, rings or the like of suitable height. The upper part of this small tower disposed within the chamber receives through a distributing nozzle 5 the nitrous acid which is to serve for enriching the gases coming from the chamber A and passing to the chamber B, while being enriched in nitrous products owing to the devices provided. The resistance to gas flow of these sprayed circuits disposed within the chamber can be reduced to a minimum owing to the large horizontal cross-section which the tower can have.

These tower devices disposed within the chambers are of cylindrical, square or rectangular form with rounded ends or they can be of any other shape, but the small height to which they are filled makes it possible to provide a very low resistance to the flow of the gases and consequently to provide the possibility of quite normal operations in the chambers without necessitating the use of a particularly powerful fan at the head or tail end of the chambers. Moreover, again on account of the small height, very little pumping power is required for the nitrous acids flowing through these towers.

The gases which have reacted in the chamber B subsequently pass through the communication 6 into the chamber C which may or may not be provided with the same device with spraying means.

For the towers disposed within the chambers it is also possible to use towers of large dimensions which can be almost as high as the chambers. The towers may be provided at their upper part with atomizers or rotary liquid sprayers and if necessary with bladed fans. The first-mentioned means permit the division of the spraying acid and the second-mentioned means permit the gases to be displaced through the towers. There is thus obtained an intimate contact between the acids and the gases, which can be improved by using dense stacks in the towers.

By recycling the acid from the vessel of one chamber a suitable number of times, for example, and distributing it at the upper part of the tower by means of a pump after the acid has been cooled, the reaction is intensified and the concentration of the manufactured acid can be increased. The bladed wheel constituting the fan, which may be placed if necessary above the towers, has the purpose of facilitating the circulation of the flowing gas while increasing the speed of circulation through the towers and in the chambers, and it enables the withdrawal of the heat liberated during the formation of the acids to be accelerated while overcoming the resistance to flow of any stacks in the towers. These stacks may be of rather small cross-section without hindering the circulation of the gases, which can be recycled in the towers through holes provided for this purpose at the bottom thereof.

The chambers provided with these internal towers can be of any shape and cross-section. The flow from one chamber tower to the next always takes place through communicating passages situated at the bottom of the chambers.

In addition, this system of internal towers can be incorporated in existing lead chamber systems.

The position of the said reaction towers inside and possibly at the centre of the chambers is justified by the desire to use to the best advantage the internal space of the chambers, and the centre of the chamber, which is always regarded as an inactive space where the action is less intense because the exchange of heat cannot take place there, since there is no suitable cooling of the gases and acids, becomes an intense production zone.

Finally, these arrangements make it possible to construct sulphuric acid producing installations of very small dimensions, each chamber having in the interior the above described towers.

It is thus possible in this way to reduce very considerably the amount of lead used in the construction while ensuring a high rate of production per unit of volume and a low consumption of nitrous products, because the heat of reaction is well eliminated at the desired time by the acid which flows and is recycled through the tower, both by the acid flowing and recycled in the tower, which can be cooled by coiled tubes and water, and by the cooling walls of the chambers, which can themselves be provided with cooling fins.

In addition the fact that the reacting gases can be caused to pass many times through the central tower sprayed with symmetrically distributed acid makes it possible to utilise the space of the apparatus to the best advantage by careful regulation of the speed of the fan and the rate of flow of circulating acid.

Finally, the reduction or omission of long pipes between the towers and chambers and the omission of a draught fan at the tail end makes it possible to reduce the cost of the plant still further.

In Figure 3 a chamber-tower receives the $SO_2$ gas coming from furnaces or dust removers at 11. The gas rises through the tower 12 which may or may not be provided with checkerwork. Spraying with nitrous acid inside the tower can be carried out by atomizers 13 and 14 which can be easily dismounted from the outside. Above the latter at 15 is the fan which enables the gases to be displaced and recycled as they pass down through the chamber and as they again pass through the orifices 16 and 17 in the tower 12.

The external wall 18 of the reaction chamber is cooled preferably by the external air.

Mechanical control of the fan 15 is provided by the mechanical device 19 placed at the top of the tower.

When the gas has reacted it leaves 20 and passes into the next chamber.

Figure 4 shows another arrangement in which the gas supplied arrives at 11 in the internal tower 12 which may or may not be filled with checkerwork. 15 is the fan driven by a hollow shaft 21 which receives at 22 the mixture of acids sprayed at 23 into the tower. Recycling of the gas takes place at 16 and 17 through the interior of the chamber 18, the wall of which withdraws the heat, then the gases which have reacted flow through 11 to the next chamber-tower.

This arrangement has the advantage that it is possible with a very compact apparatus to obtain the formation of acid in liquid phase in the central tower and in gaseous phase in the peripheral chamber with the maximum ease of control, while permitting the recycling of the reacting gases as many times as desired, consistent with the progress of the reaction. Owing to this the speed of reaction can be maintained very high, which allows the production of acid of high concentration, even exceeding 60° Bé. or 77% $H_2SO_4$, and for this reason the walls of the chambers and of the towers can be constructed of steel or stainless steel, thus economising in the use of lead.

A system comprising two chamber-towers of the type of Figure 4 for example can be constituted as shown in Figure 5. The first central tower 12 can act in the manner of a Glover tower, the external part 18 acting as a chamber, as also the external parts 18a of the second chamber the central tower 12a of said second chamber acts as a Gay-Lussac tower. The acids put in circulation by the pumps 24 and 24a flow from the vats to the towers as indicated in the drawing. The direction of circulation of the gases in the towers in relation to the acid, more especially in the tower constituting a Gay-Lussac tower, can be in parallel or otherwise, while permitting the recycling of the gases and acids.

For a system having three or more chambers with internal towers, the intermediate chambers act as production towers, as will be understood by examining Figure 6.

There is no limit to the number of chamber-towers placed in series, because the bladed fans make it possible to overcome without difficulty the resistance to flow of the systems, which occupy very little space even in the case of large scale production, and the cost of construction of such systems can be very much reduced.

I claim:

1. Apparatus for production of sulfuric acid comprising a series of reaction chambers closed at the top and having walls of substantial surface area for external cooling and a plurality of large diameter ducts interconnecting said chambers for simultaneous passage of gas and liquid acid interconnecting the bottoms of each chamber in a series, said ducts beginning with the outer wall of a chamber for withdrawal of gas therefrom and terminating at the center of the next chamber in series, said duct terminating at the center portion of a chamber communicating with a tower having an opening in the bottom centrally mounted within said chamber to extend vertically upward therein to a height less than that of the chamber, said tower being open at the top thereof for passage of gases into said chamber, means for spraying nitrous acid containing liquid from the top of said tower countercurrently to gases passing upwardly through said tower, means for supplying liquid to said chambers, and means for passing gas continuously in contact with said liquid and countercurrently through said towers from chamber to chamber in a series.

2. Apparatus for the manufacture of sulphuric acid, comprising a first reaction chamber and a second reaction chamber both closed at the top and both having walls of substantial surface area for external cooling, a tower having an opening in the bottom centrally mounted within each of said chambers to extend vertically upward to a height less than that of the corresponding chamber, the two towers being open at the top thereof for passage of gases into said chambers, a first large diameter duct for simultaneous passage of gas and liquid extending through the lower part of the outer wall of said first chamber and communicating with the central tower in said first chamber, a second large diameter duct for simultaneous passage of gas and liquid interconnecting the bottoms of said chambers, said second duct beginning with the outer wall of said first chamber and terminating with the outer wall of said second chamber, spray means for spraying liquid from the top of each of said towers countercurrently to gases passing upwardly through the tower of said first chamber and co-currently with gases passing downwardly through the tower of said second chambers, means for conveying acid from the bottom of said second chamber to said spray means associated with the tower of said first chamber, means for conveying acid from the bottom of said first chamber to said spray means associated with the tower of said second chamber, and fan means for circulating gas continuously in contact with said liquid upwardly through the central tower of said first chamber, and downwardly through the central tower of said second chamber, the central tower of said first chamber operating as a Glover tower and the central tower of said second chamber operating as a Gay-Lussac tower.

References Cited in the file of this patent

UNITED STATES PATENTS

| | | |
|---|---|---|
| 535,882 | Barbier | Mar. 19, 1895 |
| 1,342,024 | Larison | June 1, 1920 |
| 1,399,526 | Schmeidel et al. | Dec. 6, 1921 |
| 2,006,031 | Rothammel | June 25, 1935 |
| 2,430,890 | Schneible | Nov. 18, 1947 |

FOREIGN PATENTS

| | | |
|---|---|---|
| 207,589 | Great Britain | Nov. 26, 1923 |